S. B. WAY.
ARTICULATED TRAIN.
APPLICATION FILED NOV. 22, 1919.
1,412,075.
Patented Apr. 11, 1922.
3 SHEETS—SHEET 1.
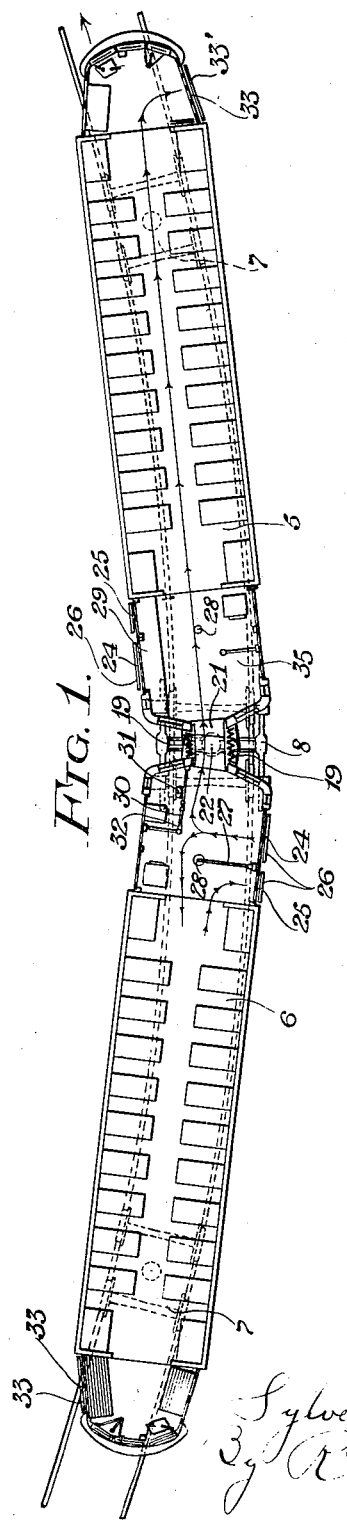
WITNESSES
INVENTOR
Sylvester B. Way
By
ATTORNEY

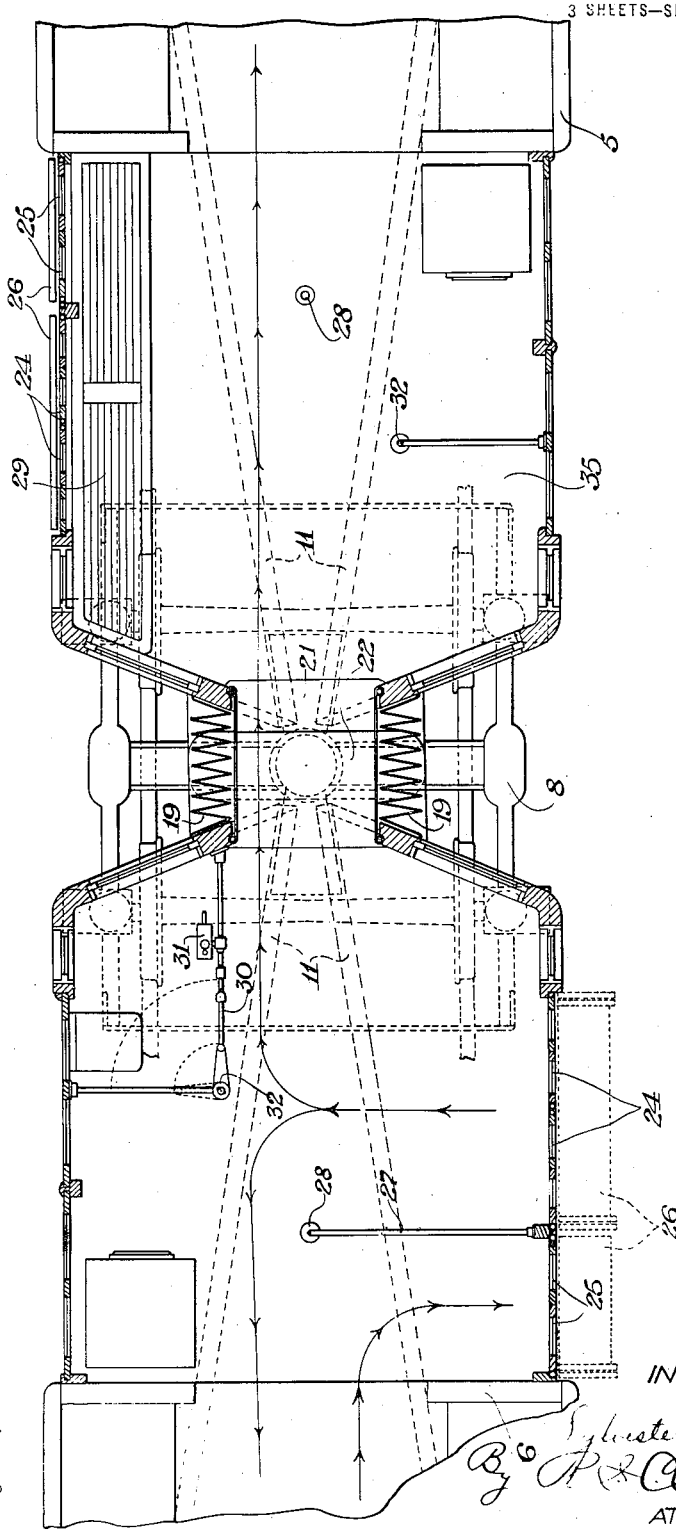

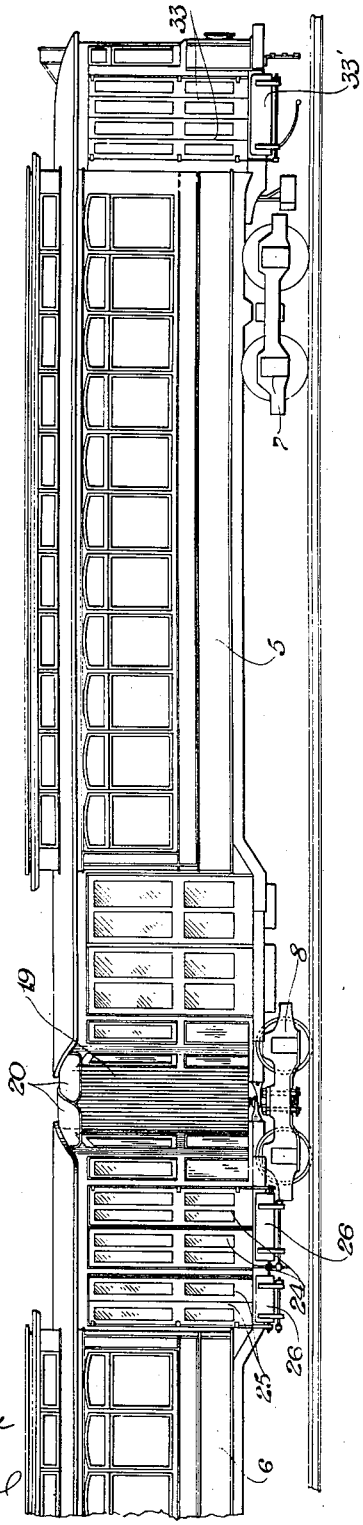

UNITED STATES PATENT OFFICE.

SYLVESTER B. WAY, OF MILWAUKEE, WISCONSIN.

ARTICULATED TRAIN.

1,412,075.   Specification of Letters Patent.   Patented Apr. 11, 1922.

Application filed November 22, 1919. Serial No. 339,779.

*To all whom it may concern:*

Be it known that I, SYLVESTER B. WAY, a citizen of the United States, and resident of Milwaukee, in the county of Milwaukee and State of Wisconsin, have invented new and useful Improvements in Articulated Trains, of which the following is a description, reference being had to the accompanying drawings, which are a part of this specification.

The invention relates to railway car construction and more particularly to an articulated train.

One of the objects of the invention is to provide an articulated three truck train for street railway use in which the two pairs of trucks at the outer end of the train are of a standard type and equipped with motors and the intermediate truck in the center of the train is of a trailer type.

A further object of the invention is to support the outer end of each body of a two-car articulated train on the outer truck both through the medium of center and side bearings as is usual and to support the inner ends of each body upon the intermediate truck so that either car body may swing with respect to this central truck.

A further object of the invention is to provide a telescoping diaphragm forming a passageway between the inner ends of the car bodies and flooring for said passageway.

A further object of the invention is to provide an articulated train in which but two men are required to handle the complete unit, with any system of fare collection, the conductor being stationed at the entrance and exit on the forward platform of the second car of the unit, and the motorman in his usual place on the forward platform of the first car.

The invention further consists in the several features hereinafter set forth and more particularly defined by claims at the conclusion hereof.

In the drawings: Fig. 1 is a sectional plan view of a unit embodying the invention; Fig. 2 is a sectional plan view on a larger scale, parts being broken away; Fig. 3 is an elevation view, parts being broken away; Fig. 4 is a detail elevation on a large scale of the intermediate truck mounting.

The unit is made up of two car bodies 5 and 6, each being supported at its outer end upon the usual trucks 7 and both supported at their inner ends upon an intermediate truck 8. The trucks 7 are of a standard type and equipped with motors so that the unit may be driven from either end and the truck 8 is preferably of the trailer type, though it may also be motorized.

Centrally located in the truck 8 is a bearing member 9 having a spherical head. A coupling member 10 secured to two converging channel frame members 11 of the car 5 has a head provided with a spherical bottom 12, fitting over the spherical head of the member 9, and a spherical top 13. A similar coupling member 14 is secured to two converging channel frame members 15 on the car 6 and has a head provided with a spherical bottom 16, fitting over the spherical top 13, and a spherical top 17. A king bolt 18 is loosely mounted in centrally disposed openings in the heads of the couplings and is secured to the member 9. This construction provides a swivel joint between the car bodies and the truck 8 so that the car bodies may swing with respect to each other and their supporting trucks and so that they may have some side swing.

An enclosed passageway between the cars is provided. The sides of this passageway are formed by telescoping diaphragms 19, the top of roofing portions 20 relatively slidably movable with respect to each other and the flooring of plates 21 and 22. The plate 21 is mounted at its outer end upon the platform of the car 5 and the plate 22 similarly mounted on the car 6. These plates are pivotally connected together centrally of their inner ends in overlapping relation and at their point of pivotal connection are pivotally supported upon the head 23 of the king bolt 18.

The construction above described enables the train to turn on curved sections of track, as shown in Fig. 1, each car being free to turn with respect to the other and with respect to the supporting trucks while the telescoping diaphragm and the relatively movable floor plates and roofing portions provide a suitable passageway between the cars.

The rear platform of the first car and the front platform of the second car are arranged so that one conductor may take care of the passengers. One side of the front platform of the second car and the opposite side of the rear platform of the first car have entrance doors 24 and exit doors 25 with the usual folding steps 26 beneath the doors. A removable railing 27 dividing the platform adjacent each set of doors into two passageways, is removably fitted into a socket 28 in either platform, depending upon what direction the car is going. In the present instance the first car is the forward car and the railing 27 is therefore on the front platform of the second car while a removable seat 29 is disposed adjacent to the doors 24 and 25 of the forward car and the conductor stands behind a foldable railing 30 from which position he oversees the depositing of fares in the box 31 and opens and shuts the doors by turning the control shaft 32. The arrows indicate the paths taken by the passengers on entrance to the unit and on exit from the rear car, the exit of passengers from the forward car being through the usual doors 33 which are opened and closed by the motorman. The usual folding steps 33' are provided beneath the doors 33.

When the train is going in the opposite direction from that shown, the conductor's station similar to that as shown on the platform of the rear car is at 35, opposite the entrance and exit doors of the car 5 and the seat 29 is disposed in position adjacent the entrance and exit doors of the car 6.

It will be noted that this arrangement provides for entrance of passengers to both cars from the entrance on the forward platform of the rear car, exit of passengers in the front car from the front door of that car and exit of passengers from the rear car from a door at the front thereof. Thus but two men are required to operate the train.

Each car body is preferably propelled by its individual motor so that the tractive effort exerted at the swivel bearing is negligible.

I desire it to be understood that this invention is not limited to any specific form or arrangement of parts except in so far as such limitations are specified in the claims.

What I claim as new and desire to secure by Letters Patent is:

1. In an articulated train, the combination of two car bodies, an intermediate truck supporting the inner ends of both bodies, a coupling connection between said bodies and truck including a king bolt, floor plates, each plate secured to the inner end of each car body and pivotally secured to the other plate in overlapping relation at their inner ends, and a pivotal connection between the said plates and said king bolt below the point of the pivotal connection between the plates.

2. In an articulated train, the combination of two car bodies joined together with a passageway between them, exits and entrances at the inner end of each car, the exit and entrance for one car being on the opposite side from that of the other, a conductor's station facing each exit and entrance, the entrance and exit and conductor's station of the rear car being used, and exits at the outer ends of each car, only that exit at the outer end of the then forward car being used.

3. In an articulated train, the combination of two car bodies joined together with a passageway between, an entrance to both cars at the front of the rear car, an exit from the rear car at the front of that car, and an exit from the front car at the front thereof.

4. In an articulated train, the combination of two car bodies joined together with a passageway between, a door at the front of the front car controlled by the motorman, and entrance and exit doors at the front of the rear car controlled by the conductor.

5. In an articulated train, the combination of two car bodies, converging frame members secured beneath the inner ends of said bodies, coupling members secured to the ends of each set of said frame members, an intermediate truck supporting said coupling members and the inner ends of said car bodies, and a king bolt carried by said truck and passing through said coupling members.

6. In an articulated train, the combination of two car bodies having a passageway between them, converging frame members secured beneath the inner ends of said car bodies, swivel couplings secured to the ends of each set of frame members, and an intermediate truck operatively connected to and supporting the swivel connection and the inner ends of the car bodies.

7. In an articulated train, the combination of two car bodies, an intermediate truck supporting the inner ends of both bodies, a swivel connection between said bodies and truck, a floor plate secured to the inner end of each car body and pivotally connected to each other, the pivotal connection between the plates being axially alined with said swivel coupling connection, and means supporting the pivotal connection between the plates.

In testimony whereof, I affix my signature, in presence of two witnesses.

SYLVESTER B. WAY.

Witnesses:
AURELIA E. JENNINGS,
H. A. MULLETT.